[54] PROCESS FOR IMPROVING THE DIGESTIBILITY OF HEMICELLULOSE-FREE STRAW

[75] Inventors: Youn W. Han, Corvallis, Oreg.; James W. Pence, El Cerrito, Calif.; Arthur W. Anderson, Corvallis, Oreg.

[73] Assignee: The United States of America as represented by the Secretary of Agriculture, Washington, D.C.

[22] Filed: Jan. 23, 1975

[21] Appl. No.: 543,707

[52] U.S. Cl. .............. 426/442; 426/623; 426/807; 260/124 A
[51] Int. Cl.² .......................................... A23K 1/18
[58] Field of Search ........... 426/210, 372, 373, 374, 426/807, 429, 430, 431, 635, 636, 442; 260/124 A, 124 R

[11] 3,937,849
[45] Feb. 10, 1976

[56] References Cited
UNITED STATES PATENTS

| | | | |
|---|---|---|---|
| 1,472,322 | 10/1923 | Beckman | 426/373 X |
| 2,269,665 | 1/1942 | Herbst | 426/373 X |
| 3,212,933 | 10/1965 | Hess et al. | 426/373 X |

*Primary Examiner*—A. Louis Monacell
*Assistant Examiner*—R. B. Penland
*Attorney, Agent, or Firm*—M. Howard Silverstein; William Takacs; Max D. Hensley

[57] ABSTRACT

Straw from which the hemicellulose has been removed is not digestible by ruminants. By application of the invention this material is rendered digestible. The process of the invention involves treatment of the hemicellulose-free straw with dioxane containing a small proportion of hydrochloric acid.

3 Claims, No Drawings

PROCESS FOR IMPROVING THE DIGESTIBILITY OF HEMICELLULOSE-FREE STRAW

DESCRIPTION OF THE INVENTION

This invention relates to and has among its objects the provision of novel processes for improving the digestibility of hemicellulose-free straw. Further objects of the invention will be evident from the following description wherein parts and percentages are by weight unless otherwise specified.

Hemicellulose is an excellent medium on which yeasts may be grown for the production of protein concentrates. The hemicellulose required for such procedure may be obtained from straw by known processes, for example, extraction of the straw with mild acid preferably containing a cationic detergent such as cetyl trimethylammonium bromide. The residue of the extraction—the hemicellulose-free straw—has little value. It cannot be employed as a feed or a component of feeds because it is not digestible by ruminants. Consequently, this residue must be disposed of by burning or other pollution-creating technique, generally at expense to the processor and to the enviroment.

Attempts to enhance the digestibility of the residue by known procedures are futile. For instance, it is known that the digestibility of whole straw (straw still containing its natural content of hemicellulose) can be greatly enhanced by treating it with dilute alkali, typically, with a 2% aqueous solution of NaOH applied at room temperature for 1 hour. When, however, this same dilute alkali treatment is applied to hemicellulose-free straw, no improvement in digestibility is achieved.

The invention described herein provides a means for obviating the problems outlined above. In particular, the invention provides novel processes for treating hemicellulose-free straw whereby to enhance its digestibility. The invention is applicable to hemicellulose-free straw derived from straws of cereal grains such as rice, wheat, oats, barley, rye, etc., or grasses such as orchard green, bent, red fescue, Kentucky blue, rye grass (annual or perennial), etc.

In a practice of the invention, the hemicellulose-free straw is soaked in acidified dioxane (also known as 1,4-diethylene dioxide). Such an amount of dioxane is used that the straw is completely immersed in the liquid. Acidification of the dioxane is accomplished by mixing in about 1 to 2% of HCl based on the weight of dioxane. The soaking is continued at room temperature for about 1 hour. Stirring may be applied continuously or at intervals to secure good contact of the straw with the acidified dioxane.

After completion of the soaking operation, the treated straw is washed thoroughly with hot water to remove dioxane and HCl, and then dried.

The products of the invention are useful for feeding ruminants as they have a digestibility of 25 to 38%, whereas the untreated hemicellulose-free straw has a digestibility of zero.

It is believed that the acidified dioxane treatment of the invention destroys the cellulose-lignin bonds in the hemicellulose-free straw. The destruction of these bonds frees the cellulose for digestion by ruminant animals, which cannot digest the cellulose-lignin complex. It should be noted, however, that the above theory forms no part of the present invention, the operability of which has been demonstrated.

EXAMPLES

The invention is further demonstrated by the following illustrative examples.

A. Fifty grams of hemicellulose-free ryegrass straw (the preparation of which is described below) was placed in a beaker with 500 ml. of dioxane containing 1% of HCl. The mixture was kept at room temperature for 1 hour with occasional stirring. The mixture was then filtered through four layers of cheesecloth, washed ten times with hot water, and dried.

A sample of this product and a sample of the untreated hemicellulose-free ryegrass straw were tested for digestibility as described below.

B. The process described in part A was applied to hemicellulose-free rice straw. The product and a sample of the starting material were tested for digestibility.

C. For purpose of comparison, a sample of hemicellulose-free ryegrass straw (1 part) was treated with 6 parts of water containing 2% NaOH at room temperature for 1 hour. The resulting alkali-treated straw was tested for digestibility.

The results obtained are summarized in the following table.

| Run | Type of straw (hemicellulose-free) | Treatment | Digestibility % |
|---|---|---|---|
| A | ryegrass | dioxane — 1% HCl | 38 |
| Control | ryegrass | none | 0 |
| B | rice | dioxane — 1% HCl | 25 |
| Control | rice | none | 0 |
| C (Control) | ryegrass | 2% NaOH | 0 |

Hemicellulose-free Straw.

The hemicellulose-free straw used as the starting material in the above examples was prepared as follows: One hundred g. of ground straw (passed through a 20-mesh screen) was mixed with 1.5 l. of 1 N. sulphuric acid, 30 g. of cetyl trimethylammonium bromide, and 30 g. of decalin (decahydronaphthalene). The mixture was heated to boiling and refluxed for an hour. Then, the mixture was filtered through four layers of cheesecloth. The solid residue collected on the filter cloth was washed 4 times with hot (90°—100° C.) water and twice with acetone, then dried overnight in air at room temperature.

Digestibility.

In vitro rumen digestibility was determined as follows: A 0.5 g. sample of the candidate material and 35 ml. of rumen fluid were placed in a 50-ml screw-capped bottle. The rumen fluid was obtained from a fistulated Holstein bull, and was mixed with a mineral and buffer solution at a ratio of 1:1. The mineral and buffer solution contained 9.88 g. of $NaHCO_3$, 9.3 g. of $Na_2HPO_4.12H_2O$, 0.47 g. of NaCl, 0.57 g. of KCl, 0.04 g. of $CaCl_2$, and 0.06 g. of $MgCl_2$ in 1 l. of water. The rumen fluid was gassed with $CO_2$ and warmed to 39°C. prior to inoculation with the candidate material. The mixture of the candidate material and rumen fluid was incubated for 3 days at 39° C. and then filtered through a sintered glass crucible (Pyrex, 30 ml., coarse) and the solid material on the filter dried overnight at 105° C. The weight loss was reported as percentage digestibility.

Having thus described the invention, what is claimed is:

1. A process for improving the digestibility of hemicellulose-free straw, which comprises
   a. soaking the hemicellulose-free straw for about one hour at room temperature in dioxane containing about 1 to 2% HCl, the amount of dioxane being enough to completely immerse the straw therein,
   b. removing dioxane and HCl from the so-treated straw by washing it with hot water, and
   c. drying the treated and washed straw.

2. The process of claim 1 wherein the starting material is hemicellulose-free ryegrass straw.

3. The process of claim 1 wherein the starting material is hemicellulose-free rice straw.

* * * * *